United States Patent
Yamayose

(10) Patent No.: US 8,974,722 B1
(45) Date of Patent: Mar. 10, 2015

(54) METHOD FOR MANUFACTURING ALUMINUM-TITANATE-BASED CERAMIC HONEYCOMB STRUCTURE

(71) Applicant: Ibiden Co., Ltd., Ogaki-shi (JP)

(72) Inventor: Kazunori Yamayose, Stuttgart (DE)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/873,576

(22) Filed: Apr. 30, 2013

Related U.S. Application Data

(60) Provisional application No. 61/787,362, filed on Mar. 15, 2013.

(51) Int. Cl.
 *C04B 35/478* (2006.01)
 *C04B 38/00* (2006.01)

(52) U.S. Cl.
 CPC .................... *C04B 38/0006* (2013.01)
 USPC ......... 264/630; 264/631; 264/632; 264/176.1

(58) Field of Classification Search
 CPC .. B28B 11/006; B01D 46/2418; Y10S 55/05; F26B 2210/02; B24B 9/06
 USPC .............. 264/630, 631, 632, 176.1
 See application file for complete search history.

(56) References Cited

U.S. PATENT DOCUMENTS

| | | | | |
|---|---|---|---|---|
| 6,649,244 B2* | 11/2003 | Hamanaka et al. | ........... | 428/116 |
| 7,253,136 B2* | 8/2007 | Mauldin et al. | ............... | 502/327 |
| 7,976,769 B2* | 7/2011 | Fletcher et al. | ............... | 264/630 |
| 8,003,035 B2* | 8/2011 | Ito et al. | ......................... | 264/267 |
| 2009/0140453 A1* | 6/2009 | Hagg | ....................... | 264/177.12 |
| 2010/0203284 A1* | 8/2010 | Kanai | ........................... | 428/116 |

FOREIGN PATENT DOCUMENTS

| EP | 1245360 A2 * | 10/2002 | ............ B28B 11/00 |
|---|---|---|---|
| WO | 2008/114637 A1 | 9/2008 | |

OTHER PUBLICATIONS

U.S. Appl. No. 13/887,638, filed May 6, 2013, Yamayose.
U.S. Appl. No. 13/872,483, filed Apr. 29, 2013, Yamayose.
U.S. Appl. No. 13/873,379, filed Apr. 30, 2013, Yamayose.
U.S. Appl. No. 13/887,688, filed May 6, 2013, Yamayose.
U.S. Appl. No. 13/873,624, filed Apr. 30, 2013, Yamayose.
U.S. Appl. No. 13/873,763, filed Apr. 30, 2013, Yamayose.
U.S. Appl. No. 13/873,933, filed Apr. 30, 2013, Yamayose.

* cited by examiner

*Primary Examiner* — Matthew Daniels
*Assistant Examiner* — Nahida Sultana
(74) *Attorney, Agent, or Firm* — Oblon, McClelland, Maier & Neustadt, L.L.P.

(57) ABSTRACT

A method for manufacturing a ceramic honeycomb structure includes kneading titania particles, alumina particles and a binder ingredient such that raw material paste including the titania particles, alumina particles and binder ingredient is prepared, forming a body made of the raw material paste and having a honeycomb structure such that the body has the honeycomb structure having through-holes extending in the longitudinal direction of the body and partitions formed between the through-holes, immersing each of end portions of the body in the longitudinal direction into a sealant slurry heated at a temperature in the range of from 50° C. to 100° C. such that the sealant slurry infiltrates into the through-holes at one of the end portions of the body and seals either end of each of the through-holes of the body, and sintering the body having the honeycomb structure such that a ceramic body having the honeycomb structure is formed.

18 Claims, 7 Drawing Sheets

Cross-sectional view at line (A-A)

METHOD FOR MANUFACTURING ALUMINUM-TITANATE-BASED CERAMIC HONEYCOMB STRUCTURE

CROSS-REFERENCE TO RELATED APPLICATIONS

The present application is based upon and claims the benefit of priority from U.S. Application No. 61/787,362, filed Mar. 15, 2013, the entire contents of which are incorporated herein by reference.

BACKGROUND OF THE INVENTION

1. Field of the Invention

The present invention relates to a method for manufacturing an aluminum-titanate-based ceramic honeycomb structural body. More specifically, the present invention relates to a method for manufacturing a sealed body by sealing either end of a through-hole of a body in a longitudinal direction with a sealant.

2. Description of Background Art

International patent publication pamphlet 2008-114637 describes a method for manufacturing a sealed honeycomb structure. The method includes a sealing process such as follows: one end portion of a honeycomb base material is immersed into sealing slurry while the sealing slurry is oscillated; the inside of a cell is set at a negative pressure and then returned to atmospheric pressure; the sealing slurry is oscillated so that it infiltrates an opening end portion of the cell; and after drying the sealing slurry which has infiltrated the opening end portion of the cell, a sealing section is formed at the end portion. The entire contents of this publication are incorporated herein by reference.

SUMMARY OF THE INVENTION

According to one aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partition portions formed between the through-holes, immersing each of end portions of the body in the longitudinal direction into a sealant slurry heated at a temperature in the range of from 50° C. to 100° C. such that the sealant slurry infiltrates into the through-holes at one of the end portions of the body and seals either end of each of the through-holes of the body, and sintering the body having the honeycomb structure such that a ceramic body having the honeycomb structure is formed.

Another aspect of the present invention is a ceramic body produced by a method for manufacturing a ceramic honeycomb structure which includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partition portions formed between the through-holes, immersing each of end portions of the body in the longitudinal direction into a sealant slurry heated at a temperature in the range of from 50° C. to 100° C. such that the sealant slurry infiltrates into the through-holes at one of the end portions of the body and seals either end of each of the through-holes of the body, and sintering the body having the honeycomb structure such that a ceramic body having the honeycomb structure is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
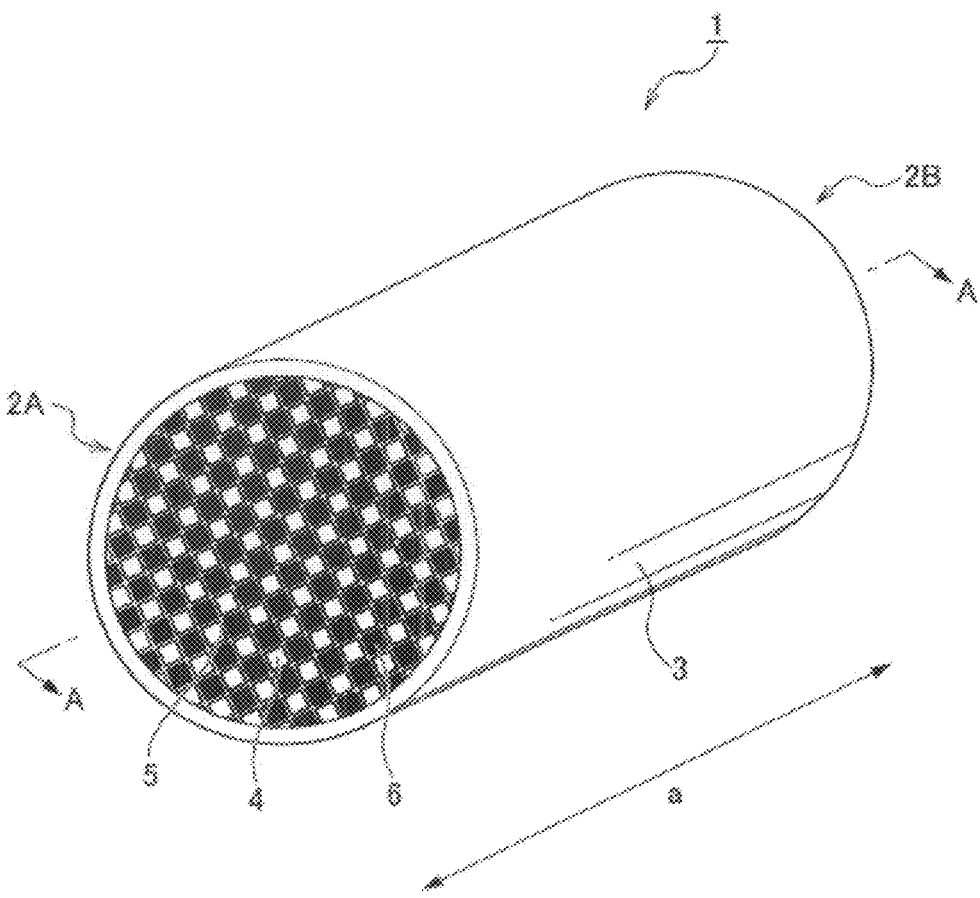
FIG. 1 is a perspective view schematically showing an example of a ceramic honeycomb structural body obtained by a manufacturing method according to an embodiment of the present invention.

The embodiments will now be described with reference to the accompanying drawings, wherein like reference numerals designate corresponding or identical elements throughout the various drawings.

FIG. 1 is a perspective view schematically showing an example of a ceramic honeycomb structural body obtained by the manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned off by partitions 5. In addition, either end of a through-hole 4 in longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined surfaces are alternately sealed. However, end surfaces (2A, 2B) of ceramic body 1 are not limited to such a pattern and may be in any other sealing pattern.

The shape of ceramic body 1 may also be an elliptic cylinder, a rectangular prism or a polygonal prism instead of a circular cylinder as shown in FIG. 1.

Figure 2:
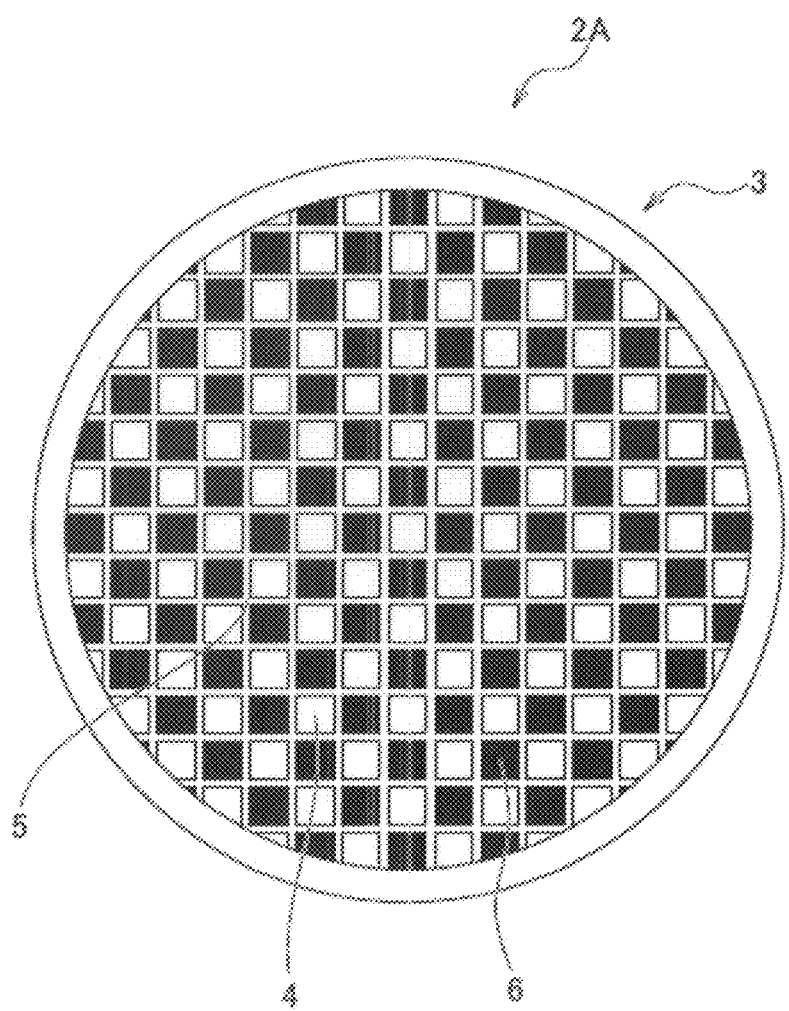
FIG. 2 is a view showing an end surface of the ceramic honeycomb structural body shown in FIG. 1.

FIG. 2 is a view showing an end surface of ceramic honeycomb structural body 1 shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined surface at end surface (2A) of ceramic body 1 is sealed so as to form a checkered pattern.

Figure 3:
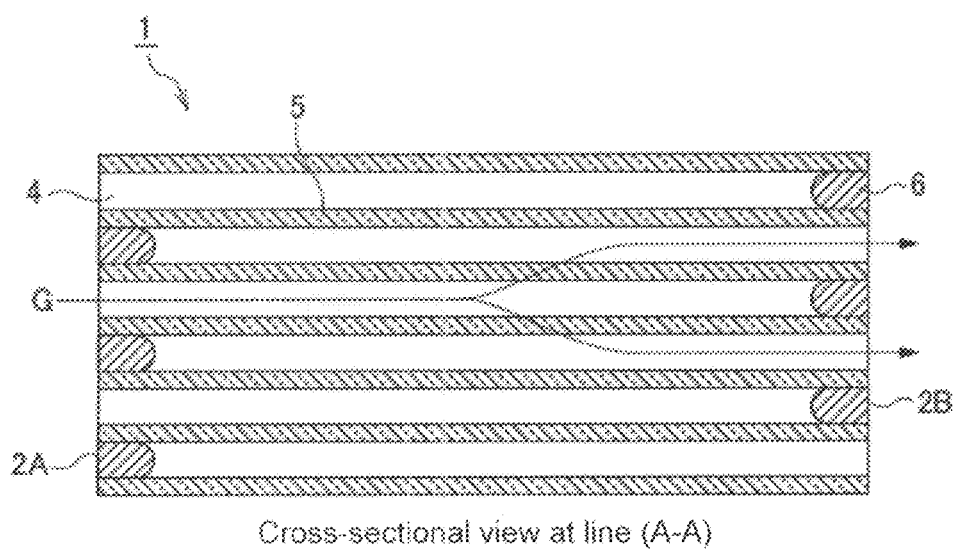
FIG. 3 is a cross-sectional view at line (A-A) of the ceramic honeycomb structural body shown in FIG. 1.

FIG. 3 is a cross-sectional view at line (A-A) of the ceramic honeycomb structural body shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic honeycomb structural body 1 according to an embodiment of the present invention, partitions 5 can function as a filter to capture particulate matter (PM) or the like, for example, as a diesel particulate filter (DPF).

Next, a method for manufacturing a ceramic honeycomb structure is described in detail according to an embodiment of the present invention.

Figure 4:
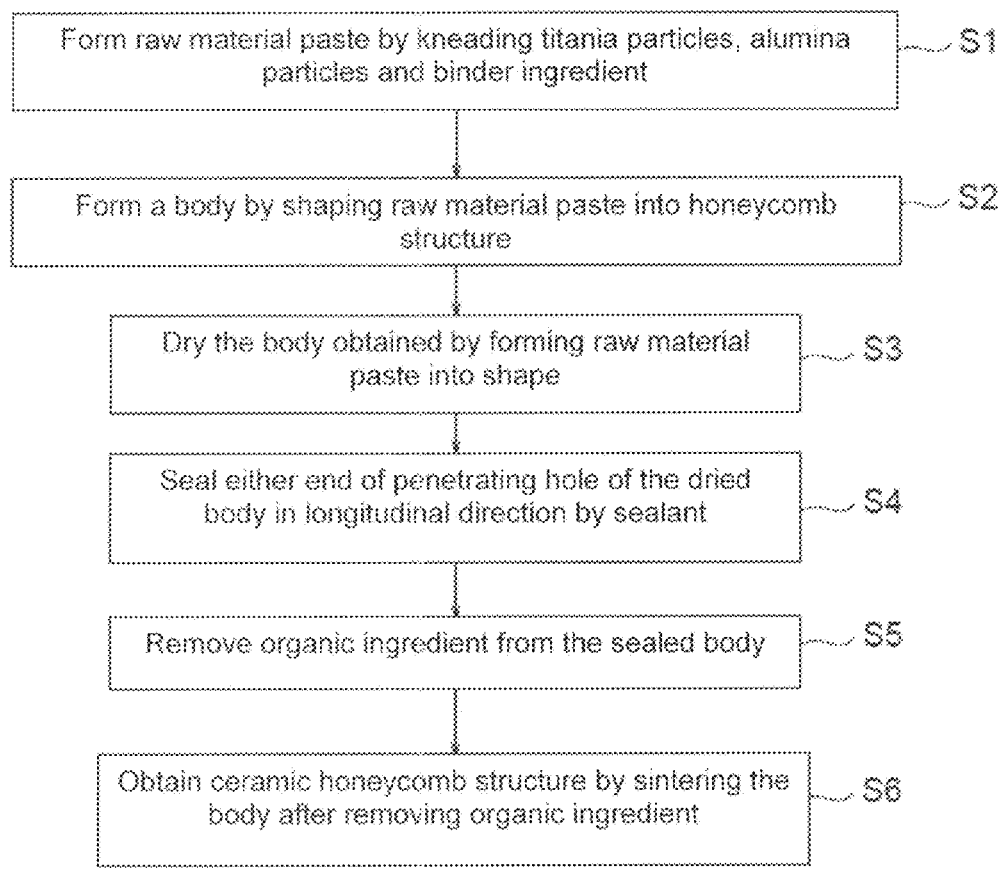
FIG. 4 is a flowchart showing an example of the manufacturing method according to an embodiment of the present invention.

FIG. 4 is a flowchart showing an example of the method for manufacturing a honeycomb structure according to an embodiment of the present invention.

An example of the method for manufacturing a ceramic honeycomb structure as shown in FIG. 4 includes the following: preparation step (S1) for preparing raw material paste by kneading titania particles, alumina particles and a binder ingredient; forming step (S2) for shaping the raw material paste into a honeycomb structure to form a body; drying step (S3) for drying the body shaped from the raw material paste; sealing step (S4) for sealing either end of a through-hole of the dried body in a longitudinal direction by immersing that end of the body into sealant slurry heated at 50° C.~100° C.; degreasing step (S5) for removing organic ingredients from the sealed body; and sintering step (S6) to obtain a ceramic honeycomb structure by sintering the body after the organic ingredients are removed.

However, it is an option to skip drying step (S3) and degreasing step (S5) in the method for manufacturing a ceramic honeycomb structure. Namely, to manufacture a ceramic honeycomb structure, it is an option to conduct preparation step (S1) for preparing raw material paste by kneading titania particles, alumina particles and a binder ingredient, and forming step (S2) for shaping the raw material paste into a honeycomb structure to form a body, and then to conduct sealing step (S4) for sealing either end of a through-hole of the body in a longitudinal direction by immersing that end of the body into sealant slurry heated at 50° C.~100° C. Directly after that, sintering step (56) is conducted to obtain a ceramic honeycomb structure by sintering the body.

Here, sealing step (S4) may be conducted either after forming step (S2) or after sintering step (S6).

In the following, each step is described.

Preparation of Raw Material Paste (S1)

In the preparation step, raw material paste is prepared by kneading titania particles, alumina particles and a binder ingredient. Also, it is an option to prepare raw material paste in the preparation step by kneading titania particles, alumina particles, mullite particles and a binder ingredient. In the present application, titania particles indicate those containing only titania, and alumina particles indicate those containing only alumina. Mullite particles mean particles formed with alumina components and silicon dioxide components. Here, titania particles and alumina particles may also contain impurities. As for impurities, for example, silicon (Si), aluminum (Al), iron (Fe), calcium (Ca), magnesium (Mg), potassium (K), sodium (Na) and the like are listed.

A method for kneading particles and a binder ingredient is not limited specifically, and a mixer, a kneader, a media mixing mill (attritor), a pressure kneader (muller) or the like may be used for kneading. Regarding titania particles and alumina particles, for example, it is an option to use titania particles and alumina particles as is, or they may be slurried using a dispersion medium such as water. Alternatively, later-described mixed particles of titania particles and alumina particles may be used. In addition, mullite particles may also be added to titania particles and alumina particles.

As for titania particles and alumina particles used in the preparation step, it is an option for titania particles and alumina particles in a precursor to be combined at an amount-of-substance ratio of titania to alumina in a range of 40:60~60:40, for example. It is also preferable to combine titania particles and alumina particles in a precursor at an amount-of-substance ratio of titania to alumina in a range of 45:55~55:45, for example. An amount-of-substance ratio here means a ratio of the amount of substance of titania to the amount of substance of alumina, not a ratio of the amount of substance of titania particles to the amount of substance of alumina particles. Thus, when mullite particles or the like are used when forming a precursor, an amount-of-substance ratio of titania to alumina is obtained based on the sum (total amount of substance of alumina) of alumina derived from alumina particles and alumina derived from mullite particles. Therefore, when mullite particles are used in the preparation step, it is preferred to combine mullite particles with titania particles and alumina particles in an amount-of-substance ratio of titania to alumina that is within the above range.

When titania particles and alumina particles are combined in a preparation step or a later-described preconditioning treatment step, their weight ratio is, for example, in a range of 35:65~55:45, more preferably, 40:60~50:50. The amount of unreacted titania or alumina remaining after sintering is reduced if combined within such a ratio.

Particle diameters of titania particles and alumina particles are not limited specifically. For example, when particle diameters of titania particles and alumina particles are compared, it is an option to employ any of the following: the diameter of titania particles is greater than that of alumina particles; the diameter of titania particles is smaller than that of alumina particles; or the diameter of titania particles is substantially the same as that of alumina particles.

As for the particle diameter of titania particles, the mean volume particle diameter is 5 μm~20 μm, for example. A mean volume particle diameter of 8 μm~18 μm or the like may also be used.

Here, mean volume particle diameters are measured using a laser diffraction particle size distribution analyzer (Beckman Coulter Inc.).

As for the particle diameter of alumina particles, the mean volume particle diameter is 2 μm~5 μm, for example.

The ratio of particle diameters of titania particles and alumina particles may be in a range of 10:1~10:3, for example.

As for the particle diameter of mullite particles to be used in addition to titania particles and alumina particles if necessary, the mean volume particle diameter is 0.1 μm~45 μm, for example. Alternatively, a mean volume particle diameter of 0.1 μm~20 μm, 0.5 μm~10 μm and so forth, for example, may also be used.

It is an option for the powder of titania particles (titania powder) containing titania particles used for a precursor in the present embodiment to include impurities such as silicon (Si), aluminum (Al), iron (Fe), calcium (Ca), magnesium (Mg), potassium (K) and sodium (Na). In the present application, "titania particle powder" means bulk (material, raw material) of titania particles to be used in a method for manufacturing a ceramic honeycomb structure. Here, impurities in titania powder may be such that are contained inevitably during a process of manufacturing titania, or may be such that are mixed into titania powder separately. In addition to impurities that make solid solutions with titania particles, other impurities that are present outside titania particles of titania powder may also be included.

It is thought that those impurities contribute to suppressing aluminum titanate, which is made of titania particles and alumina particles, from being decomposed into titania and alumina in a high temperature range, or to improving the mechanical strength of aluminum titanate.

The amount of impurities is adjusted by controlling the amount of impurities contained in raw titania material such as $Ti(OH)_4$ (titania powder) or the like or by cleansing titania compounds by using acids, alkalis or the like.

The amount of iron in titania powder is preferred to be at a weight ratio of 200 ppm~1000 ppm in the titania powder in terms of $Fe_2O_3$. When the amount of iron in titania powder is in the above range, it is thought that aluminum titanate formed when part of $Al^{3+}$ is displaced by $Fe^{2+}$ is suppressed from being decomposed into titania and alumina in a high temperature range.

The amount of silicon contained in titania powder is preferred to be 0.1 wt. %~1.0 wt. % of the titania powder in terms of $SiO_2$. When the amount of silicon in titania powder is in the above range, it is thought that aluminum titanate formed when part of $Al^{3+}$ is displaced by $Si^{4+}$ is suppressed from being decomposed into titania and alumina in a high temperature range.

No magnesium is preferred to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought MgO may cause cracking due to expansion from moisture absorption. Thus, the amount of magnesium in titanate powder is preferred to be within the above range. Alternatively, it is preferred that no magnesium, or substantially no magnesium (at or below detection limits), be contained in titania powder.

The amount of potassium in titania powder is preferred to be at a weight ratio of 100 ppm~600 ppm in the titania powder in terms of $K_2O$. In addition, the amount of sodium in titania powder is preferred to be at a weight ratio of 200 ppm~1000 ppm in the titania powder in terms of $Na_2O$. It is thought that $K_2O$ and $Na_2O$ work as sintering additives for sinter bonding aluminum titanate particles to each other so as to suppress cracking at particle boundaries among aluminum titanate particles. Thus, the amounts of potassium and sodium in titania powder are preferred to be in the above ranges.

Combined particles of titania particles and alumina particles, or combined particles of titania particles, alumina particles and mullite particles are obtained by the following preconditioning treatment step.

Preconditioning Treatment

In a preconditioning treatment step, titania particles and alumina particles are made to come in contact with and adhere to each other to form a precursor (a particle contact body of titania particles and alumina particles) in the preconditioning treatment step. Accordingly, a precursor is formed where titania particles and alumina particles are homogenized and in contact with each other.

In the preconditioning treatment step, a precursor may also be formed by further adding a sintering additive to make it come in contact with titania particles and alumina particles (particle contact body of titania particles, alumina particles and particles of a sintering additive). As for sintering additives, mullite, zircornia, alkali feldspar, strontium feldspar and the like are listed.

In the present application, "homogenized" indicates that titania particles and alumina particles are present evenly based on the amounts of substance (at a molar ratio). It is more preferred that an amount-of-substance ratio of titania to alumina in a precursor be in a range of 40:60~60:40, for example. The same as described earlier, an amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum (amount of substance of alumina) of alumina derived from alumina particles and alumina derived from mullite particles.

To have titania particles and alumina particles come in contact with each other, the following may be employed, for example: a method in which a mixture containing titania particles and alumina particles are spray-dried; a method in which titania particles and alumina particles are granulated through a rolling motion; an immersion method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed into an oscillating granulator and then put into a rolling motion to prepare a precursor; titania particles and water are placed into an oscillating granulator and put into a rolling motion, then alumina particles are added to the oscillating granulator and put into a rolling motion so that a precursor is prepared; and so forth. In such cases, a ratio of 5~10% by mass of water based on the entire mass of titania particles is used. Moreover, it is an option to use a binder ingredient (such as methyl cellulose) along with water. A ratio of 5~10% by mass of a binder ingredient based on the entire mass of titania particles may be used.

As for a method in which titania particles are immersed in an aqueous dispersion of alumina particles, for example, alumina particles are dispersed in a dispersion medium such as water to form an aqueous dispersion of alumina particles, titania particles are immersed in the aqueous dispersion of alumina particles, and then a precursor, in which titania particles and alumina particles are homogenized and in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

In the preconditioning treatment step, the obtained precursor will not be sintered directly after the preconditioning treatment step. Uniform particle diameters of a precursor are thought to be easier to form while the precursor and a binder ingredient can be kneaded in a short period of time.

By doing such a preconditioning treatment step, titania particles and alumina particles are more likely to come in contact with each other. Accordingly, precursor 7 is formed, where the surface of titania particle 8 is covered with alumina particles 9, for example (FIG. 5).

Figure 5:
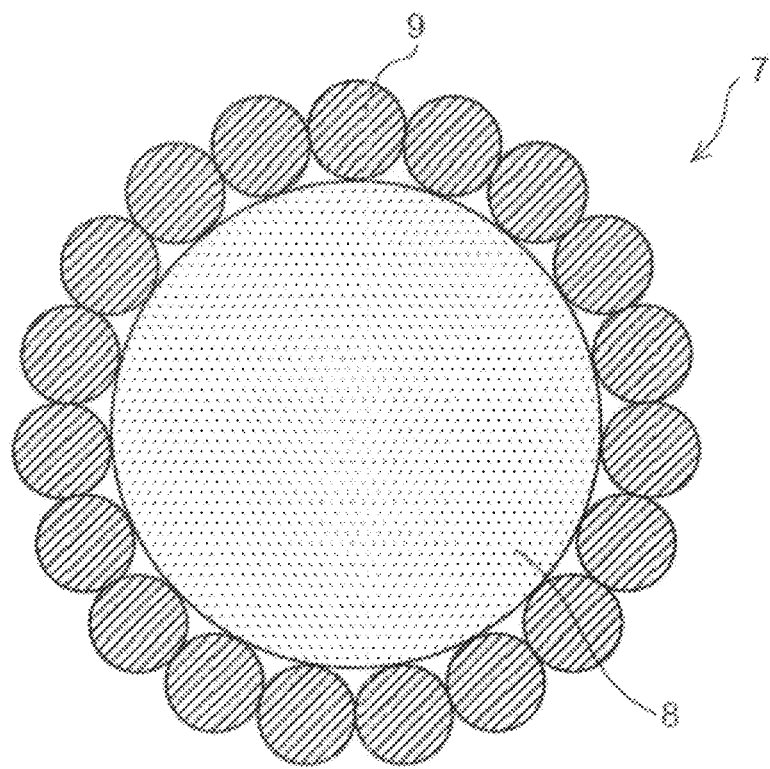
FIG. 5 is a view schematically showing an example of titania particles and alumina particles.

FIG. 5 shows a state where titania particle 8 is covered with alumina particles 9. That is an example of a precursor, and it is sufficient if a precursor is in a state where multiple alumina particles are in contact with the surface of a titania particle. In the present application, a "precursor" means a granular material where titania particles and alumina particles make contact with and adhere to each other.

A precursor when titania particles, alumina particles and mullite particles make contact with and adhere to each other (a particle contact body of titania particles, alumina particles and mullite particles) is formed by the same methods described above for having titania particles and alumina particles come in contact with each other.

To have titania particles, alumina particles and mullite particles come in contact with each other, the following may be employed, for example: a method in which a mixture containing titania particles, alumina particles and mullite particles is spray-dried; a method in which titania particles, alumina particles and mullite particles are granulated through a rolling motion; an immersion method in which a mixed aqueous dispersion of alumina particles and mullite particles is formed by dispersing alumina particles and mullite particles in a dispersion medium such as water, and then titania particles are immersed in the mixed aqueous dispersion; or a method in which a mixture of titania particles, alumina particles and mullite particles is slurried and then dried while being mixed.

As for a binder ingredient, the following are listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; and thermoplastic resins such as EVA, polyethylene, polystyrene, liquid-crystal polymer and engineering plastics.

The amount of a binder ingredient to be added is 0.1%~20% by mass based on 100% by mass of a precursor, for example. It may be 1%~15% by mass, for example.

To prepare raw material paste, other ingredients may be added to a precursor and a binder ingredient.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate; plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass.

As for dispersing agents, the following, for example, are listed: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass.

As for solvents, the following are listed, for example: alcohols such as methanol, ethanol, butanol and propanol; glycols such as propylene glycol, polypropylene glycol and ethylene glycol; water; and the like.

The amount of a solvent to be used is 0.1%~50% by mass. It may be 10%~40% by mass.

Forming of Honeycomb Structural Body (S2)

In a forming step, a body is formed by shaping the raw material paste into a honeycomb structure.

Forming raw material paste into a shape is not limited specifically, and extrusion using a honeycomb die, injection, pressing, or the like may be employed.

Drying of Body Shaped from Raw Material Paste (S3)

In a drying step, a body shaped from the raw material paste is dried.

Dryers for a drying step are not limited specifically, and the following are listed: microwave dryers, hot-air dryers, dielectric heating dryers, reduced-pressure dryers, vacuum dryers, freeze dryers and the like.

The duration and temperature for drying are set appropriately according to the volume or the like of a honeycomb body shaped from the raw material paste.

Sealing of Through-Holes (S4)

In a sealing step, an end portion of a dried body in a longitudinal direction is immersed into sealant slurry which is heated at 50° C.~100° C. so that either end of a through-hole of the body in a longitudinal direction is sealed by a sealant. When sealant slurry is heated at 50° C.~100° C., it is easier for sealant slurry to infiltrate through-holes of a body, thus reducing the physical load on the body during the sealing step. Accordingly, cracking is less likely to occur in a ceramic body after sintering.

Figure 6:
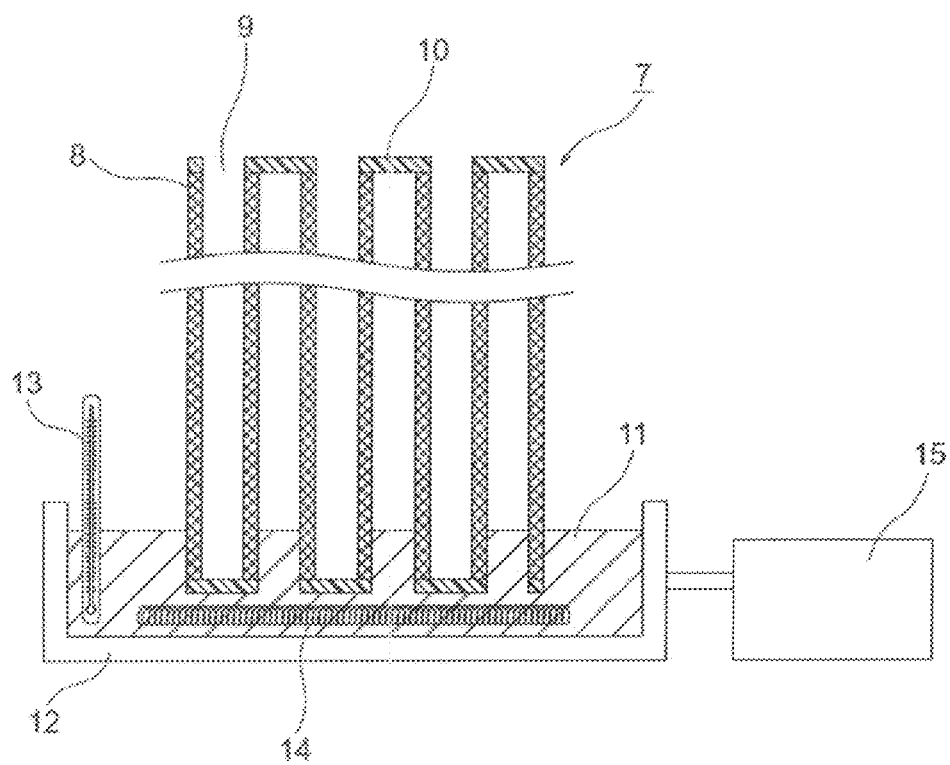
FIG. 6 is a view schematically illustrating a sealing method according to an embodiment of the present invention.

As for a method for heating sealant slurry at 50° C.~100° C., sealant slurry 11 is stored in tank 12 which is equipped with thermostat 13 and heat source 14 as shown in FIG. 6, for example, and is heated to 50° C.~100° C. Alternatively, it is an option, for example, to store sealant slurry 11 in tank 12 equipped with thermostat 13 and to heat tank 12 using an external heat source. Sealant slurry is preferred to be heated to 50° C.~90° C., more preferably 50° C.~80° C.

In addition, it is more preferred to oscillate sealant slurry heated at 50° C.~100° C. in a sealing step.

To oscillate sealant slurry, it is an option to use oscillator 15 and oscillate tank 12 with stored sealant slurry 11 as shown in FIG. 6, for example. Alternatively, sealant slurry itself may be oscillated using an oscillator. Here, an ultrasonic generator or the like may be used for an oscillator.

To oscillate sealant slurry, it is more preferable that either end portion of a body in a longitudinal direction be immersed into sealant slurry heated at 50° C.~100° C., and that the sealant slurry be oscillated at least while that end portion of the body is in the sealant slurry so that an end portion of a through-hole of the body in a longitudinal direction will be sealed by sealant. Specifically, procedures such as follows are listed: an end portion of a body is immersed into sealant slurry, the sealant slurry is oscillated for a predetermined duration, the oscillation of the sealant slurry is stopped, and the end portion of the body is lifted from the sealant slurry; an end portion of a body is immersed into oscillating sealant slurry, oscillation of the sealant slurry is stopped after a predetermined duration, and the end portion of the body is lifted from the sealant slurry; and the like. Especially, to suppress phenomena such as downward stretching of sealant slurry, sealant slurry is preferred not to be oscillated at the time of lifting an end portion of a body in a longitudinal direction from the sealant slurry.

A sealing process is not limited to the above. For example, in addition to oscillating sealant slurry while an end portion of a body in a longitudinal direction is immersed into sealant slurry, the sealant slurry may also be oscillated before and after the end portion of the body in a longitudinal direction is immersed into the sealant slurry. Namely, it is an option to immerse an end portion of a body into oscillating sealant slurry.

An end portion of a body in a longitudinal direction is preferred to be immersed into oscillating sealant slurry for 30 seconds to 60 seconds.

Other oscillation conditions are not limited specifically. For example, the tank may be oscillated in vertical and/or horizontal directions at a frequency of 1~1,000,000 Hz with an amplitude of 0.001~50 mm, etc.

As another preferred method for a sealing process, an end portion of a body in a longitudinal direction may be immersed into sealant slurry heated at 50° C.~100° C. under an open atmospheric condition. Since the sealant slurry is heated at 50° C.~100° C., the sealant slurry infiltrates a through-hole without causing negative pressure in the through-hole. Therefore, extra physical loads such as negative pressure in a body will not be exerted on the body.

To immerse an end portion of a dried body in a longitudinal direction into sealant slurry heated at 50° C.~100° C., dried body 8 in a longitudinal direction is positioned vertically, and an end portion of the body in a longitudinal direction is immersed into sealant slurry 11 stored in tank 12 as shown in FIG. 6, for example.

Here, of the through-holes of a ceramic body, end portions of some through-holes are sealed by sealant while others remain open without being sealed by sealant as described above. An end surface of a ceramic body is preferred to be in a checkered pattern. To form such a pattern, infiltration of sealant slurry into some through-holes is controlled. To control infiltration of sealant slurry into through-holes, masking film 10 is put on the end portion of a through-hole which is to remain open without being sealed by sealant, as shown in FIG. 6, for example. Placing masking film on an end portion of a through-hole of a body is not limited specifically, and an individual film (base material layer) may be placed on the body using the adhesive layer of film, for example. Alternatively, masking film is put entirely on both end surfaces of a body, and then holes (infiltration holes) are bored to allow slurry to infiltrate through such holes.

Figure 7:
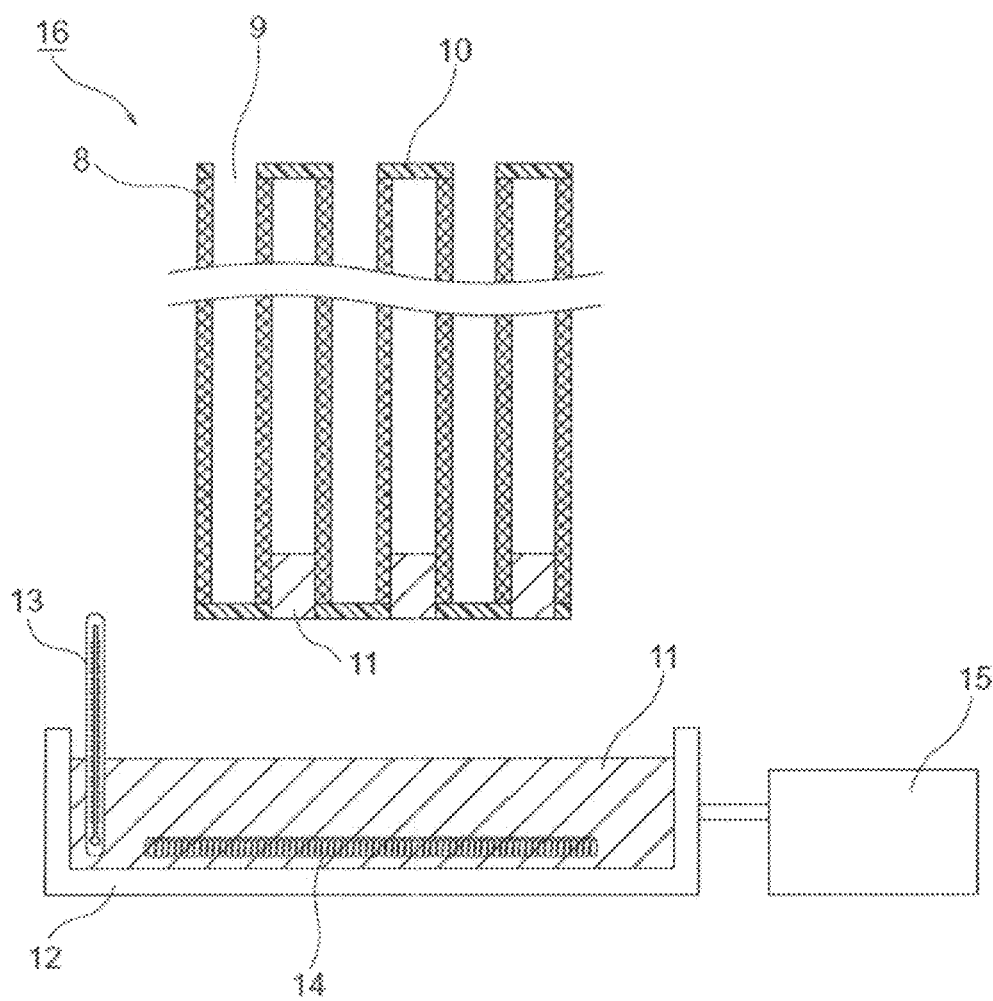
FIG. 7 is a view schematically illustrating another sealing method according to an embodiment of the present invention.

Sealant slurry is heated at 50° C.~100° C. Therefore, when an end portion of body 7 in a longitudinal direction, which is immersed into sealant slurry 11 as shown in FIG. 6, is lifted from sealant slurry 11 as shown in FIG. 7, sealant slurry 11 that has infiltrated through-holes 9 is hardened promptly, and body 16 is obtained where end portions of through-holes 9 are sealed.

Above procedures are conducted on both ends of a body so that both ends of the body are sealed.

Sealant material is not limited to any specific type. For example, it may be raw material paste made of titania particles and alumina particles, a binder ingredient or other ceramic.

Sealant slurry is prepared by adding a thermoplastic binder ingredient and solvents such as water to ceramic particles such as titania particles and alumina particles. Titania particles and alumina particles are the same as those used for raw material paste described previously in a preparation step. Also, a precursor may be formed by having titania particles and alumina particles come in contact with each other by the methods described previously in the preparation step. Alternatively, instead of using titania particles and alumina particles, other ceramic particles may be used for sealant slurry. Polybutylene terephthalate, polyphenylene sulfone or the like may be used as thermoplastic binders, and water, ethylene glycol or the like may be used as a solvent. Surfactants and plasticizers may also be added to sealant slurry. By adding a surfactant, homogeneously mixed sealant slurry is obtained. As for surfactants, phosphate, carboxylate or the like may be used. A plasticizer may also be added to sealant slurry. By adding a plasticizer, sealant material can better maintain its shape after being sealed. As for plasticizers, phthalate or the like may be used.

The viscosity of sealant slurry is properly adjusted based on the type and the like of sealant material.

Films such as those that can be melted by heating and that can be bored by irradiating laser beams are used as masking film, for example. Films having an adhesive layer may also be used. As for a specific example, masking film is formed using a base layer made of polymer material such as polyester, polyolefin or halide-polyolefin polymer and an adhesive layer which is made of acrylic adhesive material or the like and is laminated on the base layer. In addition, the thickness of masking film is preferred to be roughly 10 μm~100 μm so that it has appropriate strength and is easy to make holes.

A sealing step may be conducted after a sintering step.

Degreasing of Honeycomb Structural Body (S5)

In a degreasing step, organic ingredients are removed from the sealed body.

Conditions for removing organic ingredients from the sealed honeycomb body are not limited specifically, and may be selected appropriately according to the type and amount of organic ingredients contained in the honeycomb body. For example, degreasing is conducted at 150° C.~800° C. for two hours.

Sintering of Honeycomb Structural Body (S6)

In a sintering step, a ceramic honeycomb structure is obtained by sintering a body from which organic ingredients have been removed.

Sintering is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, a body may be sintered batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and it may be set at 1550° C. or lower.

The programmed rate of the sintering temperature is not limited specifically, and it may be set at 1° C./hour~500° C./hour, for example.

Sintering a honeycomb body is conducted under oxygen atmosphere such as atmospheric air, for example.

The duration for sintering a honeycomb body differs depending on the amount of raw material paste, the type of sintering furnace, the sintering temperature, the sintering atmosphere and the like. It may be set for 10 minutes~24 hours, for example.

Ceramic Body Having Honeycomb Structure

A ceramic honeycomb structure according to an embodiment of the present invention is obtained by a manufacturing method that includes the following: a preparation step for preparing raw material paste by kneading titania particles, alumina particles and a binder ingredient; a forming step for shaping the raw material paste into a honeycomb structure to form a body having through-holes and partitions; a sealing step for sealing an end portion of a through-hole of the body in a longitudinal direction by immersing that end portion of the body into sealant slurry heated at 50° C.~100° C.; and a sintering step to obtain a ceramic honeycomb structure by sintering the sealed body.

When an element analysis is performed on the obtained ceramic body using a scanning electron microscope (S-4800, Hitachi, Ltd.) and an energy dispersive X-ray spectrometer (EMAX Energy EX-250, Horiba, Ltd.), the ratio (weight ratio) of titania and alumina in a ceramic body is preferred to be in a range of 7:10~4:10, more preferably in a range of 6:10~5:10.

In addition, it is preferred that titania be contained at 15 wt. %~50 wt. % and alumina at 45 wt. %~70 wt. % of the entire weight of the obtained ceramic body; more preferably, titania at 22 wt. %~40 wt. % and alumina at 55 wt. %~65 wt. %. Furthermore, it is preferred for silica to be contained at 1 wt. %~20 wt. %, more preferably 3 wt. %~15 wt. % of the entire weight of the obtained ceramic body.

Partitions of a ceramic honeycomb structural body can function as a filter to capture particulate matter (PM).

Therefore, a ceramic honeycomb structure can function, for example, as a diesel particulate filter (DPF) or the like.

EXAMPLES

The present invention is further described in detail by the following examples. However, the present invention is not limited to such examples.

Example 1

Eight parts by weight of titania particles with a mean volume particle diameter of 12 µm (brand name $TiO_2$ 3020 (registered mark), Kronos Incorporated), 10 parts by weight of alumina particles with a mean volume particle diameter of 3 µm (brand name $Al_2O_3$ RMA (registered mark), Alcan Inc.), and 40 parts by weight of water are placed into a spray dryer (G8210-A, Yamato Scientific Co., Ltd.) and spray dried. Accordingly, a precursor is produced.

The precursor, 6 parts by weight of alumina particles, 3 parts by weight of silicon dioxide, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The raw material paste is extruded through a honeycomb die to form a honeycomb structural body having approximately 300 cpsi (approximately 46.5 cell/cm$^2$) with a partition thickness of approximately 0.010 inch (approximately 0.25 mm). The raw material paste is shaped into a body with a diameter of 143.8 mm and a length of 150 mm.

Then, a body is cut to a desired length and dried for 20 minutes using both microwave (2.45 GHz, 20 kW) and hot air (140° C., air speed of 1 m/s).

Next, sealant slurry is prepared by mixing 80 parts by weight of a precursor obtained above, 10 parts by weight of a solvent (diethylene glycol mono 2-ethylhexyl ether), 5 parts by weight of a thermoplastic resin binder, 2 parts by weight of an anionic surfactant (polyoxyethylene tridecyl ether phosphate) and 3 parts by weight of a plasticizer (polyoxyalkylene alkyl ether).

Masking films are placed on both end surfaces of a cut body, and the masking films are bored into a checkered pattern so that a ceramic honeycomb structural body obtained after sintering is sealed in checkered patterns which are complementary on one end surface and on the other end surface of the ceramic body. Accordingly, a masked body is formed. As for masking film, a tape with an adhesive layer (adhesive force of 5.3 N/cm) made by forming acrylic adhesive on a polyester base is used.

The portion from the end sealed with masking film to a point 5 mm upward in a longitudinal direction of a body is immersed into sealant slurry heated at 50° C. Then, the sealant body is oscillated for 45 seconds using an ultrasonic generator, and the body is lifted from the sealant slurry after the oscillation has stopped. In the same manner, the other end of the body in a longitudinal direction is also immersed into the sealant slurry, which is oscillated for 45 seconds, and lifted from the sealant slurry after the oscillation has stopped.

Under atmospheric air, the sealed body is heated from room temperature to 200° C. at a programmed rate of 40° C./hour; when the temperature has reached 200° C., it is heated to 300° C. at a programmed rate of 10° C./hour; when the temperature has reached 300° C., it is heated to 450° C. at a programmed rate of 40° C./hour; the temperature is kept at 450° C. for 5 hours to degrease the body; and it is heated at a programmed rate of 500° C./hour to 1450° C., where it is kept for 5 hours to sinter the body. Accordingly, a ceramic honeycomb structural body is obtained.

An element analysis is performed on the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in a ceramic body is in a range of 6:10~5:10.

Comparative Example 1

The same as in Example 1, a masked body is formed using masking film.

An end portion of a body in a longitudinal direction, which is sealed with masking film, is immersed into sealant slurry to a depth of 5 mm at room temperature (approximately 20° C.~25° C.) without oscillating the sealant slurry. Then, the body is lifted from the sealant slurry after 45 seconds. In the same manner, the other end of the body in a longitudinal direction is also immersed into the sealant slurry, which is not oscillated, and lifted from the sealant slurry after 45 seconds.

Under atmospheric air, the sealed body is heated from room temperature to 200° C. at a programmed rate of 40° C./hour; when the temperature has reached 200° C., it is heated to 300° C. at a programmed rate of 10° C./hour; when the temperature has reached 300° C., it is heated to 450° C. at a programmed rate of 40° C./hour; the temperature is kept at 450° C. for 5 hours to degrease the body; and it is heated at a programmed rate of 500° C./hour to 1450° C., where it is kept for 5 hours to sinter the body. Accordingly, a ceramic honeycomb structural body is obtained.

Evaluation

Using a scanning electron microscope, ceramic bodies obtained in Example 1 and Comparative Example 1 are checked for defects such as protruding portions.

As a result, in the ceramic body obtained in Example 1, it is found that sealant has infiltrated through-holes more uniformly than the ceramic body obtained in Comparative Example 1 and that defects such as protruding portions are suppressed from occurring.

When sealant slurry is heated at 80° C. and the rest of the conditions stay the same as Example 1, cracking and other defects such as protruding portions are also suppressed from the resulting ceramic body.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic honeycomb structure, comprising:
   forming a precursor comprising particles comprising titania particles and alumina particles;
   kneading a binder ingredient and the particles of the precursor comprising the titania particles and the alumina particles such that a raw material paste comprising the titania particles, the alumina particles and the binder ingredient is prepared;
   forming a body comprising the raw material paste and having a honeycomb structure such that the body has the honeycomb structure having a plurality of through-holes extending in a longitudinal direction of the body and a plurality of partition portions formed between the through-holes;
   immersing each of end portions of the body in the longitudinal direction into a sealant slurry heated at a temperature in a range of from 50° C. to 100° C. such that the sealant slurry infiltrates into the through-holes at one of the end portions of the body and seals one end of each of the through-holes of the body; and
   sintering the body having the honeycomb structure such that a ceramic body having the honeycomb structure is formed,
   wherein the forming of the precursor comprises spray-drying the alumina particles onto the titania particles.

2. The method for manufacturing a ceramic honeycomb structure according to claim 1, wherein the immersing of the end portions of the body includes oscillating the sealant slurry while each of the end portions of the body is being immersed into the sealant slurry.

3. The method for manufacturing a ceramic honeycomb structure according to claim 1, wherein each of the end portions of the body is immersed into the sealant slurry under atmospheric open air.

4. The method for manufacturing a ceramic honeycomb structure according to claim 2, wherein each of the end portions of the body is immersed into the sealant slurry under atmospheric open air.

5. The method for manufacturing a ceramic honeycomb structure according to claim 1, wherein the sealant slurry includes ceramic particles, a thermoplastic binder ingredient and a solvent.

6. The method for manufacturing a ceramic honeycomb structure according to claim 1, further comprising drying the body comprising the raw material paste and having the honeycomb structure.

7. The method for manufacturing a ceramic honeycomb structure according to claim 1, further comprising degreasing the body comprising the raw material paste and having the honeycomb structure such that an organic ingredient in the raw material paste of the body is removed.

8. The method for manufacturing a ceramic honeycomb structure according to claim 1, further comprising placing a masking film having a checkered pattern onto an end surface of the body such that each of the end portions of the body is covered in the checkered pattern, wherein the sealant slurry infiltrates into the one end of the through-holes and seals the one end of each of the through-holes of the body in the checkered pattern.

9. The method for manufacturing a ceramic honeycomb structure according to claim 1, wherein the applying of the sealant slurry comprises forming an end surface of the body having a checkered pattern such that the one end of each of the through-holes of the body is sealed in the checkered pattern.

10. The method for manufacturing a ceramic honeycomb structure according to claim 2, wherein the sealant slurry includes ceramic particles, a thermoplastic binder ingredient and a solvent.

11. The method for manufacturing a ceramic honeycomb structure according to claim 3, wherein the sealant slurry includes ceramic particles, a thermoplastic binder ingredient and a solvent.

12. The method for manufacturing a ceramic honeycomb structure according to claim 4, wherein the sealant slurry includes ceramic particles, a thermoplastic binder ingredient and a solvent.

13. The method for manufacturing a ceramic honeycomb structure according to claim 2, further comprising placing a masking film having a checkered pattern onto an end surface of the body such that each of the end portions of the body is covered in the checkered pattern, wherein the sealant slurry infiltrates into the one end of the through-holes and seals the one end of each of the through-holes of the body in the checkered pattern.

14. The method for manufacturing a ceramic honeycomb structure according to claim 3, further comprising placing a masking film having a checkered pattern onto an end surface of the body such that each of the end portions of the body is covered in the checkered pattern, wherein the sealant slurry infiltrates into the one end of the through-holes and seals the one end of each of the through-holes of the body in the checkered pattern.

15. The method for manufacturing a ceramic honeycomb structure according to claim 4, further comprising placing a masking film having a checkered pattern onto an end surface of the body such that each of the end portions of the body is covered in the checkered pattern, wherein the sealant slurry infiltrates into the one end of the through-holes and seals the one end of each of the through-holes of the body in the checkered pattern.

16. The method for manufacturing a ceramic honeycomb structure according to claim 2, wherein the applying of the sealant slurry comprises forming an end surface of the body having a checkered pattern such that the one end of each of the through-holes of the body is sealed in the checkered pattern.

17. The method for manufacturing a ceramic honeycomb structure according to claim 3, wherein the applying of the sealant slurry comprises forming an end surface of the body having a checkered pattern such that the one end of each of the through-holes of the body is sealed in the checkered pattern.

18. The method for manufacturing a ceramic honeycomb structure according to claim 4, wherein the applying of the sealant slurry comprises forming an end surface of the body having a checkered pattern such that the one end of each of the through-holes of the body is sealed in the checkered pattern.

* * * * *